United States Patent [19]

Naciri

[11] Patent Number: 5,761,310
[45] Date of Patent: Jun. 2, 1998

[54] COMMUNICATION SYSTEM FOR MESSAGES ENCIPHERED ACCORDING TO AN RSA-TYPE PROCEDURE

[75] Inventor: Robert Naciri, Chatenay Malabry, France

[73] Assignee: De La Rue Cartes ET Systemes SAS, Paris, France

[21] Appl. No.: 683,493

[22] Filed: Jul. 18, 1996

[30] Foreign Application Priority Data

Jul. 26, 1995 [EP] European Pat. Off. ............ 95 09085

[51] Int. Cl.$^6$ ............................ H04L 9/30; H04L 9/00
[52] U.S. Cl. ............................ 380/30; 380/9; 380/23; 380/25; 380/49
[58] Field of Search ........................ 380/9, 23, 24, 380/25, 30, 49, 50

[56] References Cited

U.S. PATENT DOCUMENTS

| | | | |
|---|---|---|---|
| 4,405,829 | 9/1983 | Rivest et al. | 380/30 |
| 4,424,414 | 1/1984 | Hellman et al. | 380/30 |
| 4,736,423 | 4/1988 | Matyas | 380/23 |
| 4,870,681 | 9/1989 | Sedlak | 380/30 |
| 4,933,970 | 6/1990 | Shamir | 380/30 |
| 4,944,007 | 7/1990 | Austin | 380/30 X |
| 5,588,061 | 12/1996 | Ganesan et al. | 380/30 |
| 5,627,893 | 5/1997 | Demytko | 380/30 |

OTHER PUBLICATIONS

"Fast Decipherment Algorithm for RSA Public–Key Cryptosystem", Electronics Letters 14th Oct. 1982 vol. 18, No. 21, pp. 905–907.

Primary Examiner—Bernarr E. Gregory
Attorney, Agent, or Firm—Oliff & Berridge, PLC

[57] ABSTRACT

The procedure involves key numbers "d" and "e" and a modulus N, so hat "N" is the product of two factors "p" and "q" which are prime numbers $N=p.q$, and $e.d=1_{MOD\phi(N)}$, where $\phi(N)$ is the Euler indicator function. The procedure provides enciphered message parts and for deciphering them comprises: a modulus-determining step for determining a deciphering modulus chosen from "p" and "q", a modular reduction step for making a first modular reduction of the number "d" with a modulus equal to said deciphering modulus "$(p-1).(q-1)$" with the aim of producing a reduced number, a reduction step for making a second modular reduction of each enciphered message part with a modulus equal to said deciphering modulus with the aim of producing a reduced enciphered message part, an exponentiation step for computing a modular exponentiation of each reduced enciphered message part with a modulus equal to said deciphering modulus and with an exponent equal to said reduced number with the aim of restoring said message.

5 Claims, 3 Drawing Sheets

COMMUNICATION SYSTEM FOR MESSAGES ENCIPHERED ACCORDING TO AN RSA-TYPE PROCEDURE

BACKGROUND OF THE INVENTION

The present invention relates to a communication system for messages enciphered according to an RSA-type procedure which implies key numbers "d" and "e" and a modulus N, so that "N" is a product of two factors "p" and "q" which are prime numbers N=p.q, and $e.d=1_{MOD\phi(N)}$ where $\phi(N)$ is the Euler indicator function, which system comprises, on the one hand, at least an enciphering device formed by:

splitting means for splitting up the message to be enciphered into at least one message part to be enciphered, exponentiation means for carrying out with each message part to be enciphered a modular exponentiation of modulus "N" and having an exponent equal to a first one of said key numbers with the aim of producing a part of the enciphered message, and also at least a deciphering device.

The invention likewise relates to a procedure utilized in the system, a user device of the microcircuit card type comprising on the same medium an enciphering device and a deciphering device and a server center called entrusted center for processing information signals between the various user devices.

A procedure of this type is described in the article entitled "FAST DECIPHERMENT ALGORITHM FOR A PUBLIC-KEY CRYPTOSYSTEM" by J. J. Quisquater and C. Couvreur, published in *ELECTRONICS LETTERS* 14th Oct. 1982.

This procedure implies the use of the Chinese remainder theorem to obtain a rapid deciphering without harming the qualities of the RSA procedure.

SUMMARY OF THE INVENTION

The present invention, also based on the Chinese remainder theorem, proposes a system in which the rapidity of the deciphering process is improved to a very large measure.

Therefore, such a system is characterized in that it comprises at least a deciphering device formed by:

modulus-determining means for determining a deciphering modulus chosen from said factors, first modular reduction means for making a first modular reduction of the number "d" with a modulus equal to said deciphering modulus reduced by unity for producing a reduced number, second reduction means for making a second modular reduction of each enciphered message part with a modulus equal to said deciphering modulus with the aim of producing a reduced enciphered message part, second exponentiation means for computing a modular exponentiation of each reduced enciphered message part with a modulus equal to said deciphering modulus and with an exponent equal to said reduced number with the aim of restoring said message.

Thus, due to the measures recommended by the invention, it is no longer necessary to perform the combining operation of the remainders of formula (1) of aforementioned article.

BRIEF DESCRIPTION OF THE DRAWINGS

These and other aspects of the invention will be apparent from and elucidated with reference to the embodiments described hereinafter.

In the drawings.

DETAILED DESCRIPTION OF THE PREFERRED EMBODIMENTS

Figure 1:
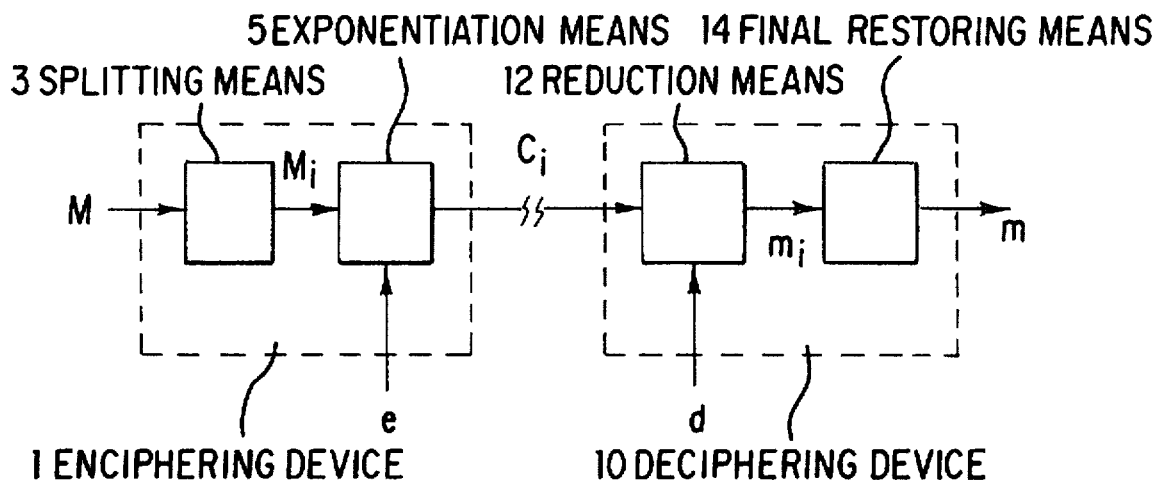
FIG. 1 shows a communication system according to the invention.

In FIG. 1, reference 1 indicates the enciphering device. This one receives a message M, for example the French word "BONJOUR" which means GOOD-DAY. This message is split up by the splitting means 3 into message parts to be enciphered. These parts are formed each by letters forming the part and a sequence of digital codes is obtained, for example, the decimal digital codes M=66, M2=79, M3=78, M4=74, M5=79, M6=85, M7=82, which represent the ASCII codes for "BONJOUR". Exponentiation means 5 perform exponentiations of these digital codes by taking parameters "e" and "N" in accordance with measures of which the first one results directly from the invention:

Numbers p and q are taken to be higher than 255: p=263 and q=311, so that N=p.q=81793.

"e" is selected, so that it is a prime number with p−1 and q−1, that is: e=17.

Now one determines d: $e.d=1_{MOD\phi(N)}$.

In the case where p and q are prime numbers $\phi(N)=(p-1).(q-1)$ that is: $e.d=1_{MOD(40610)}$. Among the "d", which satisfy the above relation, one may take 54943. In principle, "d" is unknown at the enciphering device 1. The means 5 may encode the message by computing the modular exponentiation of each of said codes:

$$Ci = Mi^{17}{}_{MOD(N)}, i=1\ldots 7$$

giving the coded message which comprises the enciphered parts:

C1=62302, C2=47322, C3=74978, C4=00285, C5=47322, C6=09270, C7=54110.

According to the invention, for deciphering this message, a deciphering device 10 is provided. This device uses a first means for determining the deciphering modulus from the numbers "p" and "q"; preferably, the smaller of the two is chosen to gain on the calculations that is:

p=(263), second means perform the modular reducing operation with a number "d"

$$d_r = 5493_{MOD262}$$
$$= 185.$$

Then, depending on the modulus "p", the enciphered message parts are reduced.

$$C_r1 = 62302_{MOD263}$$
$$= 234$$

and respectively, $C_r2=245$, $C_r3=023$, $c_r4=022$, $C_r5=245$, $c_r6=065$, $c_r7$ giving the deciphered message parts:

$m_1 = C_r 1^{185}{}_{MOD263} = 66$ $m_2 = c_r 2^{185}{}_{MOD263} = 79$ $m_3 = C_r 3^{185}{}_{MOD263} = 78$ $m_4 = C_r 4^{185}{}_{MOD263} = 74$ $m_5 = c_r 5^{185}{}_{MOD263} = 79$ $m_6 = c_r 6^{185}{}_{MOD263} = 85$ $m_7 = C_r 7^{185}{}_{MOD263} = 82$.

The message "m" is then restored by concatenation, by the final restoring means 4 transcribing in usual characters. If everything is done well, m=M.

Figure 2:
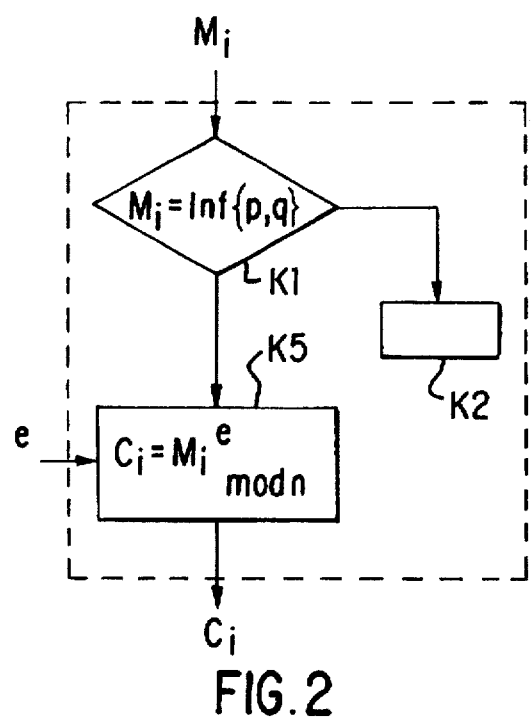
FIG. 2 shows an enciphering flow chart in accordance with the invention.
Figure 3:
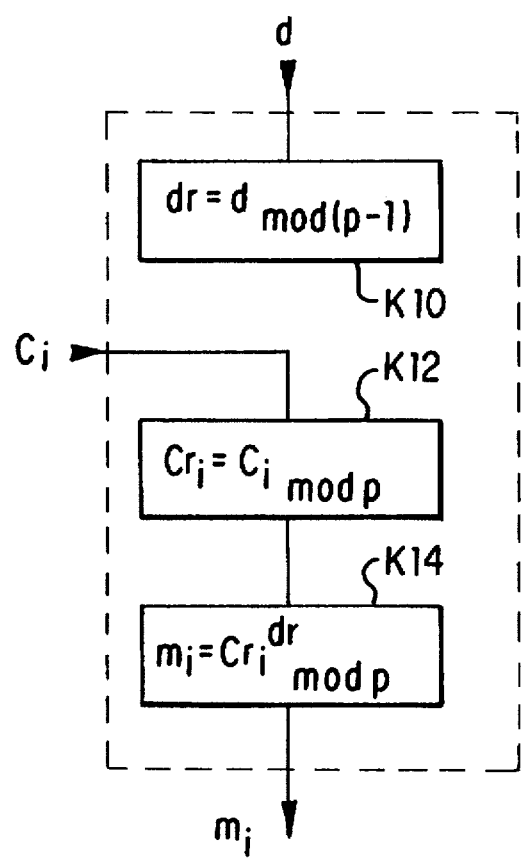
FIG. 3 shows a deciphering flow chart according to the invention.

The enciphering device 1 and the deciphering device 10 are actually put into effect based on processors programmed for executing the operations of the flow charts shown in the FIGS. 2 and 3 which follow.

The flow chart of FIG. 2 explains the operation of the device 1. Box K1 indicates a test made with each part of the enciphered message. If this value exceeds that of the selected deciphering modulus (thus the smaller of "p" and "q"), then there is declared that there is an error in box K2. If not, box K5 is proceeded to, where the actual enciphering operation is carried out, that is to say, a modular exponentiation. Thus, enciphered message parts Ci are obtained.

The flow chart of FIG. 3 shows the deciphering operations carried out by the deciphering device 10. This flow chart shows in box K10 an operation prior to the reduction of the number d to obtain a reduced key number "dr". Box K12 is a modular reducing operation of "p", carried out with the enciphered message parts, and box K14 is a modular exponentiation of modulus "p" and whose exponent is "dr" with the enciphered message parts.

The enciphering and deciphering devices may be inserted on the same medium to form a user device. The devices can then communicate with each other by utilizing the enciphering procedure according to the invention.

Figure 4:
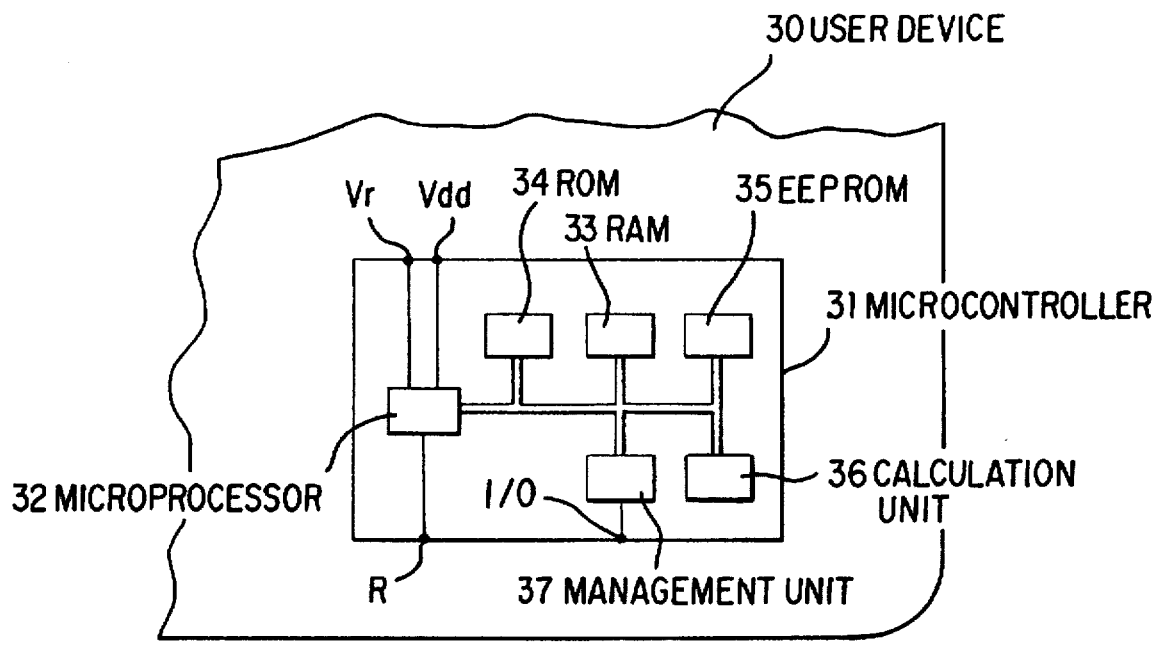
FIG. 4 shows the scheme of a user device.

FIG. 4 shows the structure of a user device. This device is made on the basis of a trusted microcontroller such as, for example, the 83C852 made by Philips. Such a microcontroller 31 is shown in FIG. 4 and formed by a microprocessor 32, a random access memory 33 and a read-only memory 34 which notably contains instructions of operation for implementing the invention, notably the enciphering operations and deciphering operations already described. It also comprises an EEPROM memory 35 for containing various data such as the secret key of the card, the public key of a third party with which it exchanges information signals... It also comprises a calculation unit 36 which carries out the necessary operations for the functions of enciphering, a management unit 37 for the inputs/outputs furthermore connected to an input I/O of the microcontroller 31. Said elements of the microcontroller 31 are interconnected by a bus 38.

Any additional detail may be found back in the manual of the microcontroller 83C852 mentioned above.

An interesting example of an application of the invention is the transfer of key DES by the RSA, as this has been described in the article "Threats of Privacy and Public Keys for Protection" by Jim Bidzos, published in the document PROCEEDINGS OF COMPCON, 91, 36$^{TH}$ IEEE COMPUTER SOCIETY INTERNATIONAL CONFERENCE, 25 Feb. to 1 Mar. 1991, San Francisco-N.Y. (U.S.). The protocol for exchanging session key DES between two users A and B via a public channel may be as follows. Let $\{n_A, d_A\}$ and $\{n_B, d_B\}$ be the respective secret keys of the users A and B. For example, A wishes to transmit the session key $K_S$ to B.

User A $m = K_s$

The enciphering is carried out by using the public key $e_B$.

$C_{AB} = m^e B$ and the cryptogram $C_{AB}$ is transmitted by the public channel.

User B
  reception of the cryptogram $m = C_{AB}$
  deciphering of the cryptogram $m = C_{AB}{}^{d}B$
  the use of key $K_S$ Generally, $K_S$ is approximately smaller than a key RSA. $K_S$ may be a session key DES of the order of 56 binary elements and p and q are of the order of 256 bits.

Lots of official bodies prohibit the enciphering of messages in public communications. The invention applies particularly well when a confidence server SC is used to avoid this prohibition.

Figure 5:
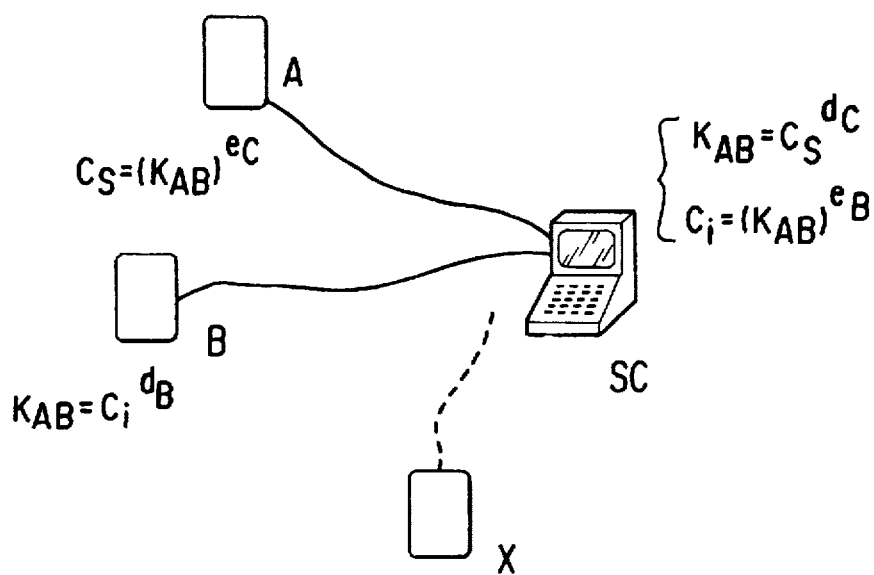
FIG. 5 shows a system according to the invention, which implies a server called confidence server and a plurality of user devices.

This case is shown in FIG. 5. This Figure illustrates the case where a plurality of user devices A, B, ... X can communicate with each other via a confidence server SC. This server SC has all the knowledge to know all the messages exchanged by the various users uncoded.

By way of example there is explained the case where the user A wishes to communicate a key DES $K_{AB}$ to user B. Thus, A enciphers the key $K_{AB}$ with the aid of the public key $e_B$ of the server SC which itself deciphers same upon reception, then enciphers it with B's public key $e_B$. Finally, B deciphers the cryptogram with the aim of finding back the key which was initially sent by A.

Thus, in this case the procedure is applied both at the deciphering end of the user B and that of server SC. Thus, the invention is used to obtain a good availability of the server for a plurality of users. The gain of computation caused by the invention is particularly noticeable.

What is claimed is:

1. Communication system for messages enciphered according to an RSA-type procedure which implies key numbers "d" and "e" and a modular number N, so that "N" is a product of two factors "p" and "q" which are prime numbers N=p.q and that $e.d = 1_{MOD\phi(N)}$ where $\phi(N)$ is the Euler indicator function, which system comprises, on the one hand, at least an enciphering device formed by:

splitting means for splitting up the message to be enciphered into at least one message part to be enciphered, exponentiation means for carrying out with each message part to be enciphered a modular exponentiation of modulus "N" and having an exponent equal to a first one of said key numbers with the aim of producing a part of the enciphered message, and on the other hand at least a deciphering device, characterized in that it comprises at least a deciphering device formed by:

modulus determining means for determining a deciphering modulus chosen from said factors, first modular reduction means for making a first modular reduction of the number "d" with a modulus equal to said deciphering modulus reduced by unity for producing a reduced number, second reduction means for making a second modular reduction of each enciphered message part with a modulus equal to said deciphering modulus with the aim of producing a reduced enciphered message part, second exponentiation means for computing a modular exponentiation of each reduced enciphered message part with a modulus equal to said deciphering modulus and with an exponent equal to said reduced number with the aim of restoring said message.

2. Enciphering/deciphering procedure utilized in the system as claimed in claim 1, according to which procedure, and for enciphering a message:

said message is split up into message parts to be enciphered, each part undergoes a modulo-M modular exponentiation operation with an exponent equal to a first one of said key numbers, for producing enciphered message parts, and for deciphering the message:

the enciphered message parts undergo a deciphering exponentiation operation for producing deciphered message parts, characterized in that the message parts to be enciphered are presented in the form of numbers smaller than the numbers p and q, the deciphering exponentiation operation comprises:

a step for determining a deciphering modulus chosen from said factors, a preceding step for making a first modular reduction of the number "d" with a modulus equal to said deciphering modulus reduced by unity with the aim of producing a reduced number, a step for making a second modular reduction of the parts of the enciphered messages with a modulus equal to said deciphering modulus for producing reduced enciphered message parts, a modular exponentiation step made with the parts of the reduced enciphered messages with a modulus equal to said deciphering modulus and with an exponent equal to said reduced number.

3. User device for a communication system in which messages are enciphered according to an RSA-type procedure which implies key numbers "d" and "e" and a modular number N, so that "N" is a product of two factors "p" and "q" which are prime numbers N=p.q and that $e.d=1_{MOD\phi(N)}$ where $\phi(N)$ is the Euler indicator function said user device comprising an enciphering device formed by:

splitting means for splitting up the message to be enciphered into at least one message part to be enciphered, exponentiation means for computing with each message part to be enciphered a modular exponentiation of modulus "N" and having an exponent equal to a first one of said key numbers, with the aim of producing a part of the enciphered message, and at least a deciphering device, characterized in that the enciphering device is formed by:

modulus determining means for determining a deciphering modulus chosen from said factors, first modular reduction means for making a first modular reduction of the number "d" with a, modulus equal to said deciphering modulus reduced by unity for producing a reduced number, second reduction means for making a second modular reduction of each enciphered message part with a modulus equal to said deciphering modulus with the aim of producing a reduced enciphered message part, second exponentiation means for effecting a modular exponentiation of each reduced enciphered message part with a modulus equal to said deciphering modulus and with an exponent equal to said reduced number to restore said message.

4. User device as claimed in claim 3, wherein said user device comprises a chip card.

5. Server for a communication system for messages enciphered according to an RSA-type procedure which implies key numbers "d" and "e" and a modular number N, so that "N" is a product of two factors "p" and "q" which are prime numbers N=p.q and that $e.d=1_{MOD\phi(N)}$ where $\phi(N)$ is the Euler indicator function, said server comprising an enciphering device and a deciphering device for using intermediaries with user devices, said enciphering device formed by:

splitting means for splitting up the message to be enciphered into at least one message part to be enciphered, exponentiation means for computing with each message part to be enciphered a modular exponentiation of modulus "N" and having an exponent equal to a first one of said key numbers, with the aim of producing a part of the enciphered message, and characterized in that said deciphering device is formed by:

modulus determining means for determining a deciphering modulus chosen from said factors, first modular reduction means for making a first modular reduction of the number "d" with a modulus equal to said deciphering modulus reduced by unity with the aim of producing a reduced number, second reduction means for making a second modular reduction of each enciphered message part with a modulus equal to said deciphering modulus with the aim of producing a reduced enciphered message part, second exponentiation means for computing a modular exponentiation of each reduced enciphered message part with a modulus equal to said deciphering modulus and with an exponent equal to said reduced number to restore said message.

* * * * *